United States Patent
Oishi et al.

(10) Patent No.: US 9,789,438 B2
(45) Date of Patent: Oct. 17, 2017

(54) AIR POLLUTION CONTROL APPARATUS

(71) Applicant: MITSUBISHI HEAVY INDUSTRIES, LTD., Tokyo (JP)

(72) Inventors: Tsuyoshi Oishi, Tokyo (JP); Hiroshi Tanaka, Tokyo (JP); Naohiko Ukawa, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 361 days.

(21) Appl. No.: 14/403,734

(22) PCT Filed: May 17, 2013

(86) PCT No.: PCT/JP2013/063828
§ 371 (c)(1),
(2) Date: Nov. 25, 2014

(87) PCT Pub. No.: WO2013/176060
PCT Pub. Date: Nov. 28, 2013

(65) Prior Publication Data
US 2015/0125353 A1    May 7, 2015

(30) Foreign Application Priority Data
May 25, 2012    (JP) .................. 2012-119786

(51) Int. Cl.
*B01D 50/00*    (2006.01)
*B01D 53/78*    (2006.01)
(Continued)

(52) U.S. Cl.
CPC ........... *B01D 53/78* (2013.01); *B01D 53/504* (2013.01); *B01D 53/507* (2013.01); *B01D 53/56* (2013.01);
(Continued)

(58) Field of Classification Search
CPC ...... B01D 53/78; B01D 53/504; B01D 53/50; B01D 53/60; B01D 53/75
(Continued)

(56) References Cited

U.S. PATENT DOCUMENTS

2005/0214187 A1    9/2005    Johnson
2009/0013868 A1    1/2009    Darde et al.
(Continued)

FOREIGN PATENT DOCUMENTS

EP    2 489 423 A1    8/2012
JP    52-084171 A    7/1977
(Continued)

OTHER PUBLICATIONS

International Search Report dated Aug. 20, 2013, issued in corresponding application No. PCT/JP2013/063828.
(Continued)

*Primary Examiner* — Tom P Duong
(74) *Attorney, Agent, or Firm* — Westerman, Hattori, Daniels & Adrian, LLP (57) ABSTRACT

An air pollution control apparatus includes: a denitration unit that removes nitrogen oxides from a flue gas; a desulfurization unit that is installed on a gas flow downstream side of the denitration unit to remove the sulfur oxides in a flue gas 11B; a finish denitration and desulfurization unit that is installed on the gas flow downstream side of the desulfurization unit to perform finish denitration and desulfurization of $NO_2$ and $SO_2$; and a carbon dioxide recovery unit that is installed on the gas flow downstream side of the finish denitration and desulfurization unit to remove and recover the carbon dioxide in a flue gas.

7 Claims, 5 Drawing Sheets (51) Int. Cl.
*B01D 53/60* (2006.01)
*B01D 53/62* (2006.01)
*B01D 53/56* (2006.01)
*B01D 53/75* (2006.01)
*B01D 53/50* (2006.01)

(52) U.S. Cl.
CPC ............ *B01D 53/60* (2013.01); *B01D 53/62* (2013.01); *B01D 53/75* (2013.01); *B01D 53/50* (2013.01); *B01D 2251/304* (2013.01); *B01D 2251/50* (2013.01); *B01D 2258/0283* (2013.01); *Y02C 10/04* (2013.01)

(58) Field of Classification Search
USPC .................................................. 422/168, 170
See application file for complete search history.

(56) References Cited

U.S. PATENT DOCUMENTS

| 2011/0014106 | A1 | 1/2011 | Pfeffer et al. | |
| 2013/0136679 | A1* | 5/2013 | Nagayasu | B01D 53/75 423/220 |

FOREIGN PATENT DOCUMENTS

| JP | 03-293017 A | 12/1991 | | |
| JP | 05-245338 A | 9/1993 | | |
| JP | 2005-040683 A | 2/2005 | | |
| JP | 2005-087828 A | 4/2005 | | |
| JP | EP 2578295 A1 * | 4/2013 | ............ | B01D 53/75 |
| WO | 85/03238 A2 | 8/1985 | | |
| WO | 2011/152548 A1 | 12/2011 | | |
| WO | 2011/152551 A1 | 12/2011 | | |

OTHER PUBLICATIONS

Written Opinion dated Aug. 20, 2013, issued in corresponding application No. PCT/JP2013/063828.
Translation of Written Opinion of the International Searching Authority dated Aug. 20, 2013, issued in corresponding Application No. PCT/JP2013/063828. (4 pages).
Extended European Search Report dated Feb. 4, 2016, issued in counterpart European Patent Application No. 13793951.8. (9 pages).
Notice of Acceptance dated Apr. 29, 2016, issued in counterpart Australian Patent Application No. 2013264029. (3 pages).
Decision to Grant a Patent dated Nov. 8, 2016, issued in counterpart Japanese Patent Application No. 2012-119786, with English translation. (3 pages).
Notice of Allowance dated Sep. 28, 2016, issued in counterpart Canadian Patent Application No. 2,877,611. (1 page).

* cited by examiner

AIR POLLUTION CONTROL APPARATUS

FIELD

The present invention relates to an air pollution control apparatus in which degradation of a $CO_2$ absorbent is suppressed in a pre-treatment that recovers and removes $CO_2$ in a flue gas.

BACKGROUND

As one of causes of a global warming phenomenon, for example, a greenhouse effect due to $CO_2$ contained in the flue gas from a boiler has been pointed out, and countermeasures thereof have also become an internationally urgent need in protecting the global environment. A source of generation of $CO_2$ extends to the various fields of activities where fossil fuel is combusted, and a demand to suppressing the discharge tends to be further strengthened. Along with this, directed at a power generation apparatus such as a thermal power plant that uses a large amount of fossil fuel, a method of removing and recovering $CO_2$ in a flue gas by bringing the flue gas of a boiler into contact with an amine-based absorbent has been extensively studied.

Since a $CO_2$ absorbent that absorbs $CO_2$ is an amine compound, the degradation and shortening of life of the absorbent due to accumulation of a substance caused by $NO_2$ and $SO_2$ in the flue gas have become a problem.

For that reason, conventionally, there has been a suggestion for reducing a $SO_2$ concentration in the flue gas from a coal combustion boiler and reducing a $NO_2$ concentration in a natural gas flue gas (Patent Literatures 1 and 2).

CITATION LIST

Patent Literature

Patent Literature 1: Japanese Laid-open Patent Publication No. 2005-87828
Patent Literature 2: Japanese Laid-open Patent Publication No. 2005-40683

SUMMARY

Technical Problem

However, in the suggestions of Patent Literatures 1 and 2, there is a suggestion of performing an advanced desulfurization such that a sulfur oxide concentration becomes 1 ppm, but further reduction (for example, 0.1 ppm or less) in the $SO_2$ concentration has been required in recent years.

Similarly, in the suggestion of Patent Literature 2, there is a suggestion for performing an advanced denitration such that the nitrogen dioxide concentration becomes 3 ppm, but a further reduction (for example, preferably, 0.2 ppm or less at the outlet) in the $NO_2$ concentration has been required in recent years.

In view of the above-described problems, an object of the present invention is to provide an air pollution control apparatus that is capable of significantly suppressing the degradation of the $CO_2$ absorbent in the pre-treatment that recovers and removes $CO_2$ in the flue gas.

Solution to Problem

According to a first aspect of the present invention in order to solve the above-mentioned problems, there is an air pollution control apparatus including: a denitration unit that removes nitrogen oxides from a flue gas up to an extremely low concentration, the flue gas being discharged from a boiler and containing nitrogen oxides, sulfur oxides, and carbon dioxide; a desulfurization unit that is installed on a gas flow downstream side of the denitration unit to remove the sulfur oxides in the flue gas up to an extremely low concentration; a finish denitration and desulfurization unit that is installed on the gas flow downstream side of the desulfurization unit to perform finish denitration and desulfurization of $NO_2$ having an extremely low concentration and $SO_2$ having an extremely low concentration remaining in the flue gas by an absorbent containing sulfite; and a carbon dioxide recovery unit that is installed on the gas flow downstream side of the finish denitration and desulfurization unit to remove and recover the carbon dioxide in the flue gas.

According to a second aspect of the present invention, there is provided the air pollution control apparatus according to the first aspect, further including: a $SO_2$ alkali removal unit that is installed on the gas flow downstream side of the finish denitration and desulfurization unit to remove residual $SO_2$ in the flue gas by alkali.

According to a third aspect of the present invention, there is provided the air pollution control apparatus according to the second aspect, further including: a gas cooling unit that is installed on the gas flow downstream side of the $SO_2$ alkali removal unit to cool the flue gas.

According to a fourth aspect of the present invention, there is provided the air pollution control apparatus according to the second aspect, wherein the finish denitration and desulfurization unit and the $SO_2$ alkali removal unit installed above the gas flow downstream side are integrally disposed in a tower.

According to a fifth aspect of the present invention, there is provided the air pollution control apparatus according to the fourth aspect, wherein the gas cooling unit is disposed above the downstream side of the $SO_2$ alkali removal unit.

According to a sixth aspect of the present invention, there is provided the air pollution control apparatus according to any one of the second to fifth aspects, wherein an oxidizing agent is introduced into the $SO_2$ alkali removal unit.

According to a sixth aspect of the present invention, there is provided the air pollution control apparatus according to any one of the second to sixth aspects, wherein excessive water of the $SO_2$ alkali removal unit is introduced into the finish denitration and desulfurization unit.

According to a seventh aspect of the present invention, there is provided the air pollution control apparatus according to any one of the second to seventh, wherein excessive water of the gas cooling unit is introduced into the $SO_2$ alkali removal unit.

Advantageous Effects of Invention

According to the air pollution control apparatus of the present invention, it is possible to further remove $NO_2$ having an extremely low concentration (for example, 1 ppm or less) and $SO_2$ having an extremely low concentration (for example, 50 ppm or less) remaining in the flue gas, using an absorbent containing the sulfite, and to perform finish denitration and desulfurization up to 0.1 ppm or less. This enables the accumulation of degradation inhibitory substances of the absorbent to be suppressed, thereby suppressing a decline in the absorption performance, and maintaining the durability of the absorption capacity.

DESCRIPTION OF EMBODIMENTS

Preferred embodiments of an air pollution control apparatus according to the present invention will be described in detail with reference to the accompanying drawings. In addition, the present invention is not intended to be limited by these embodiments, and when there is a plurality of embodiments, an embodiment configured by combining each embodiment is also included.

First Embodiment

Figure 1:
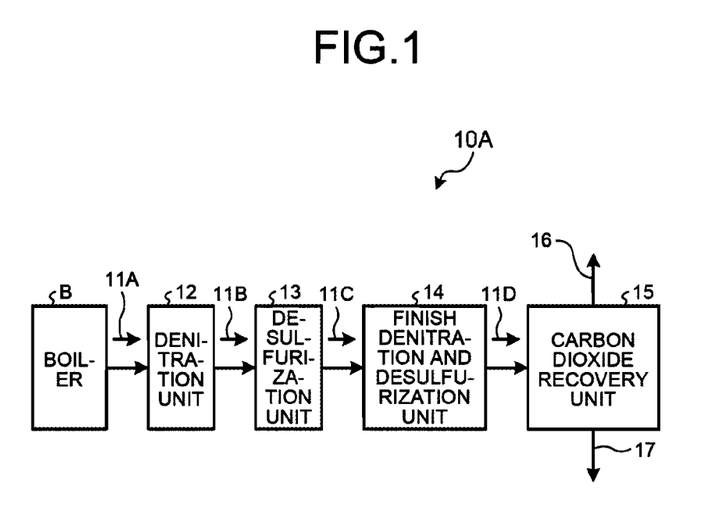
FIG. 1 is a schematic view of an air pollution control apparatus according to a first embodiment.
Figure 2:
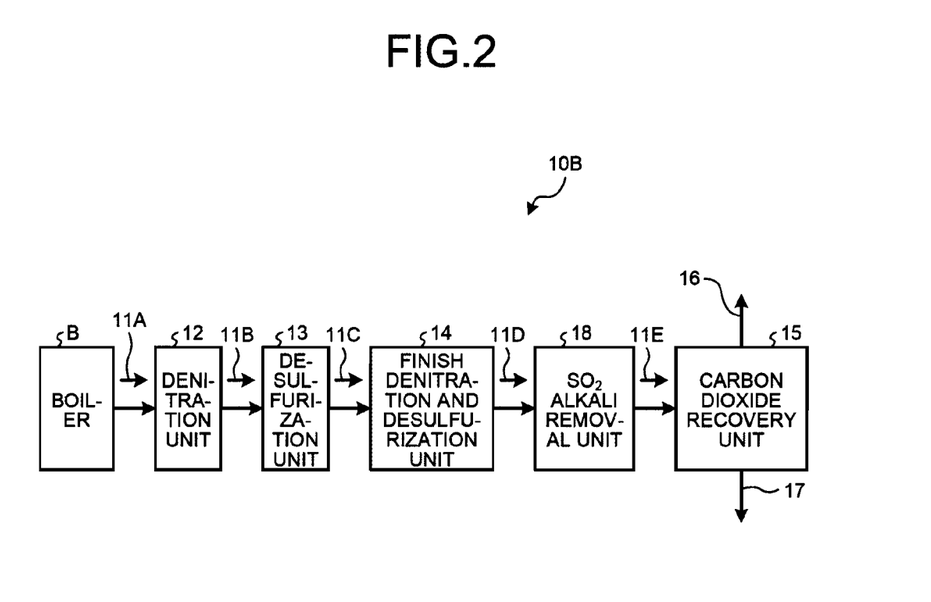
FIG. 2 is a schematic view of another air pollution control apparatus according to the first embodiment.
Figure 3:
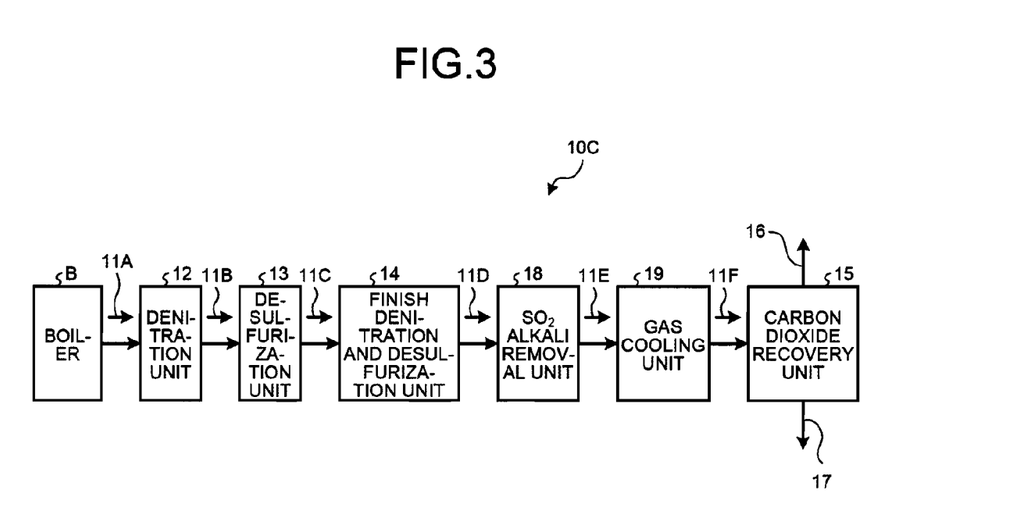
FIG. 3 is a schematic view of another air pollution control apparatus according to the first embodiment.

FIG. 1 is a schematic view of an air pollution control apparatus according to a first embodiment. FIGS. 2 and 3 are schematic views of another air pollution control apparatus according to the first embodiment.

As illustrated in FIG. 1, an air pollution control apparatus 10A according to the present embodiment has a denitration unit 12 that removes nitrogen oxides from a flue gas 11A containing nitrogen oxides, sulfur oxides, and carbon dioxide, for example, discharged from a boiler B up to an extremely low concentration, a desulfurization unit 13 that is installed on a gas flow downstream side of the denitration unit 12 and removes the sulfur oxides in a flue gas 11B up to an extremely low concentration, a finish denitration and desulfurization unit 14 that is installed on the gas flow downstream side of the desulfurization unit 13 and performs finish denitration and desulfurization of $NO_2$ having the extremely low concentration and $SO_2$ having the extremely low concentration remaining in a flue gas 11C by an absorbent containing sulfite, and a carbon dioxide recovery unit 15 that is installed on the gas flow downstream side of the finish denitration and desulfurization unit 14, and removes and recovers carbon dioxide in a flue gas 11D. In FIG. 1, reference numeral 16 represents a purified gas, and reference numeral 17 represents recovery $CO_2$.

In this embodiment, $NO_2$ in the flue gas 11A is denitrified up to an extremely low concentration (for example, 1 ppm or less) by the generally installed denitration unit 12. As the denitration unit 12, an ammonia denitration unit can be adopted as an example.

In addition, in the desulfurization unit 13, the $SO_2$ concentration in the flue gas 11B after denitration is desulfurized up to an extremely low concentration (for example, 50 ppm or less). In this embodiment, as the desulfurization unit 13, it is possible to adopt a desulfurization unit of a wet limestone and gypsum method as an example.

In the present invention, the $NO_2$ concentration and the $SO_2$ concentration in the flue gas 11C is finish-removed to an extremely low concentration (0.1 ppm or less), using the absorbent containing the sulfite.

In particular, by performing the finish removal of the $SO_2$ concentration up to the extremely low concentration (0.1 ppm or less), it is possible to suppress the performance degradation of the absorbent used in the carbon dioxide recovery unit 15.

Furthermore, it is possible to reduce the number of times of frequency of a cleaning operation (a washing operation) of the absorbent as an operation of preventing the degradation of the absorbent compared to the related art. For example, the frequency of the cleaning operation can be reduced by about half. When the $SO_2$ concentration is 1 ppm, there was a need to perform a washing operation once every 40 days, but when the $SO_2$ concentration is 0.1 ppm, the washing operation performed once every 80 days is sufficient.

In this embodiment, since, as the absorbent containing the sulfite used in the finish denitration and desulfurization unit 14, $SO_2$ contained in the flue gas 11C is used, there is no need to separately supply a medication from the outside. When sulfite in the finish denitration and desulfurization unit is insufficient, it is possible to cope with insufficiency by increasing the $SO_2$ concentration of the outlet of the desulfurization unit.

Figure 5:
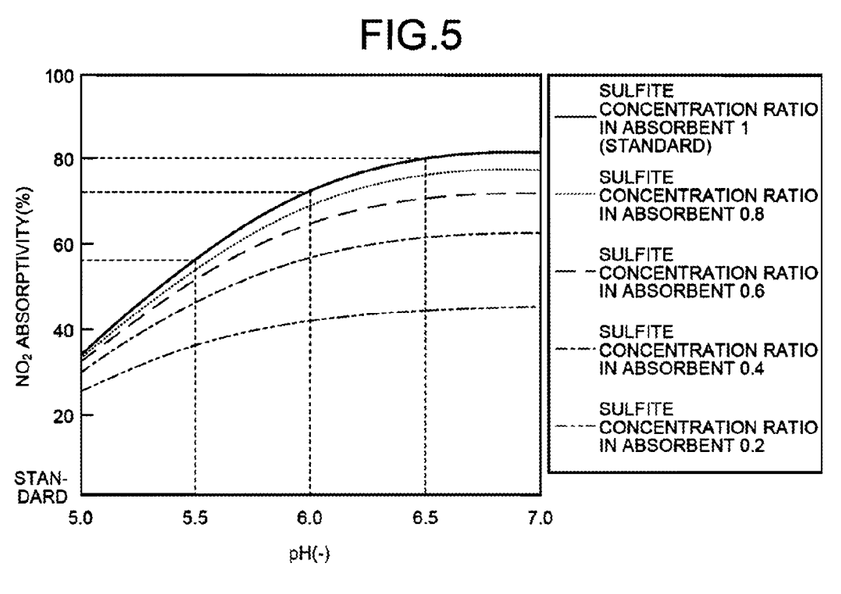
FIG. 5 is a graph illustrating a relation between pH and $NO_2$ absorptivity when changing a sulfite concentration in the absorbent.
Figure 6:
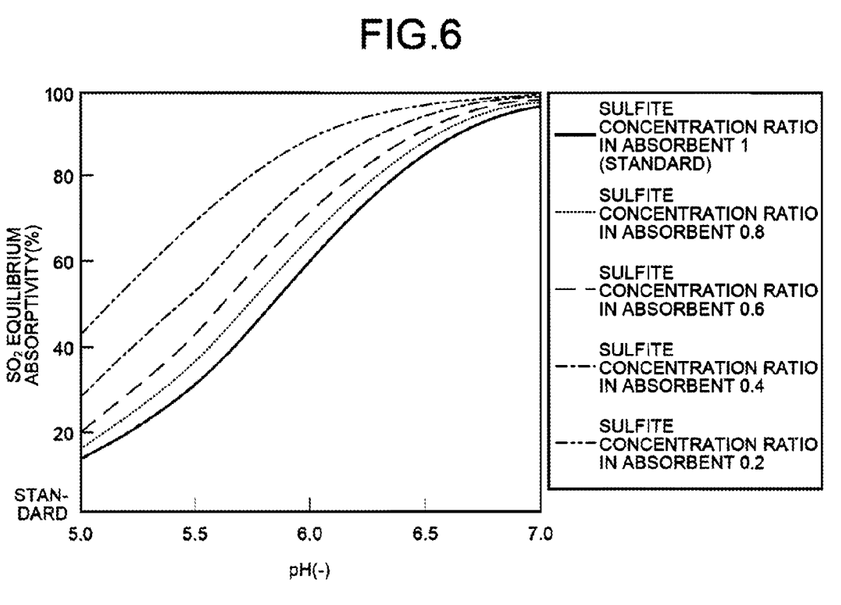
FIG. 6 is a graph illustrating a relation between pH and $SO_2$ equilibrium absorptivity when changing the sulfite concentration of the absorbent.

FIG. 5 is a graph illustrating a relation between pH and $NO_2$ absorptivity when the sulfite concentration in the absorbent is changed. FIG. 6 is a graph illustrating a relation between pH and the $SO_2$ equilibrium absorptivity when the sulfite concentration in the absorbent is changed.

Here, the standard sulfite concentration is 63 mmol/L. The standard sulfite concentration in the drawings is a sulfite concentration corresponding to a case where $SO_2$ absorbed by effluent of 5.5 t/hr from the finish denitration and desulfurization cooling tower is not oxidized at all, when the $SO_2$ concentration is 14 ppm in a case where an amount of the inlet flue gas is, for example, 700,000 $Nm^3$/hr.

As illustrated in FIGS. 5 and 6, the higher the sulfite concentration is, the better the removal efficiency of $NO_2$ is, but the removal efficiency of $SO_2$ declines.

Therefore, in order to achieve the extremely low concentration of the $NO_2$ and $SO_2$ concentration remaining in the flue gas, pH and sulfite concentration is set.

In this embodiment, it is preferred that pH of the finish denitration and desulfurization unit 14 be pH 5.5 or higher, and preferably, be in a range of 5.5 to 7.0.

Furthermore, when placing emphasis on the $NO_2$ removal in the flue gas, at the expense of the removal of $SO_2$ at the finish denitration and desulfurization unit 14, as in an air pollution control apparatus 10B illustrated in FIG. 2, on the gas flow downstream side of the finish denitration and desulfurization unit 14, a $SO_2$ alkali removal unit 18 may be separately installed to remove remaining $SO_2$ therein to be a target $SO_2$ concentration of 0.1 ppm or less.

In this case, as the alkali treatment agent, it is possible to use, for example, sodium hydroxide (NaOH) or the like.

Here, by supplying air into the $SO_2$ alkali removal unit 18 to perform the air oxidation, the sulfite concentration may be reduced to improve the desulfurization performance.

Furthermore, in order to prevent the entrainment of the alkali treatment agent to the carbon dioxide recovery unit 15 side and perform cooling of a flue gas 11E, as in an air pollution control apparatus 10C illustrated in FIG. 3, a gas cooling unit 19 may be installed on the gas flow downstream side of the $SO_2$ alkali removal unit 18.

Thus, by performing the desulfurization and denitration by the finish denitration and desulfurization unit 14 including the sulfite, and by separately disposing the advanced desulfurization by the absorbent added with the alkali treatment agent (NaOH), it is possible to maintain the $NO_2$ removal performance and further to prevent a decrease in $SO_2$ removal performance, the concentration of $NO_2$ and $SO_2$ in a flue gas 11F introduced into the carbon dioxide recovery unit 15 can be set to 0.1 ppm or less, and it is possible to suppress the accumulation of the substance caused by $NO_2$ and $SO_2$ to the $CO_2$ absorbent.

Second Embodiment

Figure 4:
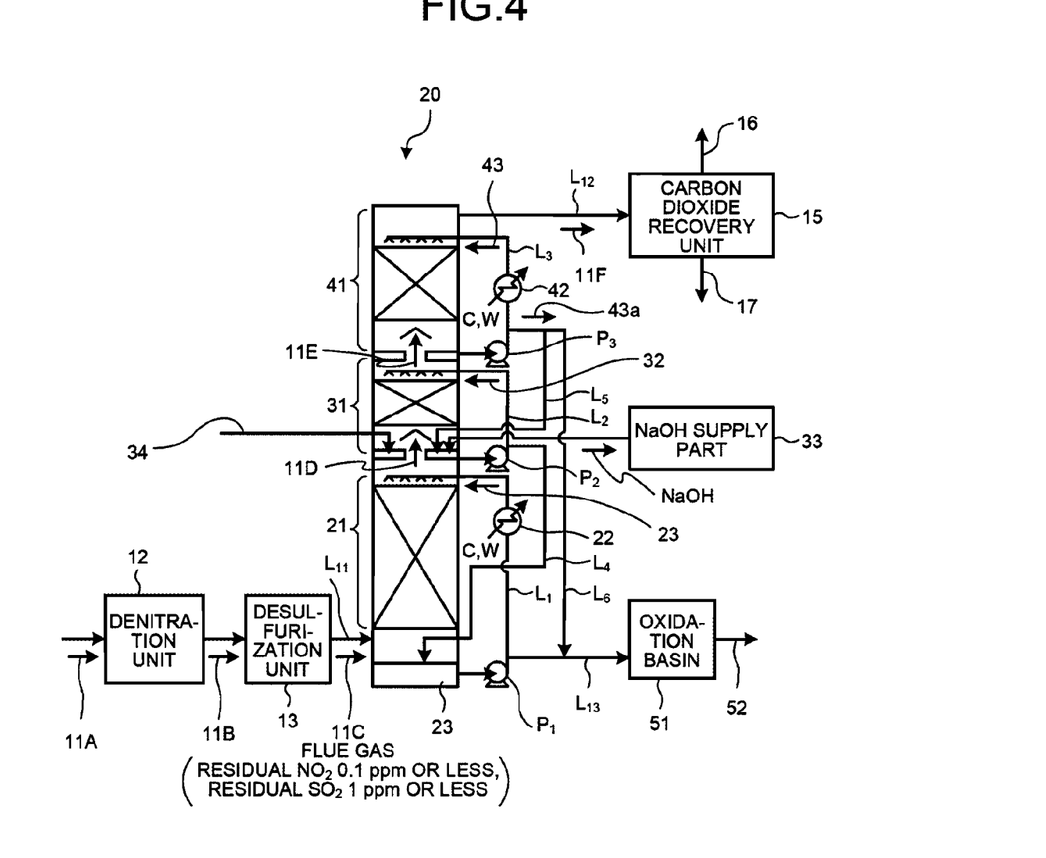
FIG. 4 is a schematic view of an air pollution control apparatus according to a second embodiment.

An air pollution control apparatus according to an embodiment of the present invention will be described with reference to the drawings. FIG. 4 is a schematic view of an air pollution control apparatus according to a second embodiment. In addition, the same components as in the first embodiment are denoted by the same reference numerals, and a detailed description thereof will not be provided.

In the air pollution control apparatus according to the present embodiment, the finish denitration and desulfurization unit 14, the $SO_2$ alkali removal unit 18 installed above the gas flow downstream side thereof, and the gas cooling unit 19 installed above the downstream side of the $SO_2$ alkali removal unit 18 are integrally disposed within a finish denitration and desulfurization cooling tower 20.

As illustrated in FIG. 4, in the order from the bottom of the tower, the finish denitration and desulfurization cooling tower 20 includes a $SO_2$ and $NO_2$ absorption part 21, a $SO_2$ alkali removal unit 31, and a cooling water washing part 41.

In the $SO_2$ and $NO_2$ absorption part 21 of the bottom side of the finish denitration and desulfurization cooling tower 20, a gas introduction line $L_{11}$ that introduces the flue gas 11C after the desulfurization treatment is provided in the bottom, and a gas discharge line $L_{12}$ that sends the flue gas 11F after the advanced denitration and desulfurization cooling treatment to the carbon dioxide recovery unit 15 from the tower top part is connected thereto.

The $SO_2$ and $NO_2$ absorption part 21 performs a denitration and desulfurization by bringing the flue gas 11C into contact with an absorbent 23 containing the sulfite circulated by a circulation line $L_1$, when introducing the introduced flue gas 11C upward from the bottom. A circulation pump $P_1$ and a cooling heat exchanger 22 are disposed in the circulation line $L_1$.

In the $SO_2$ and $NO_2$ absorption part 21, the flue gas 11D subjected to denitration and desulfurization is introduced into the $SO_2$ alkali removal unit 31, and when introducing the introduced flue gas 11D upward, desulfurization is performed by bringing the flue gas D into contact with an alkali absorbent 32 circulated by a circulation line $L_2$. A circulation pump $P_2$ is disposed in the circulation line $L_2$. An alkaline agent (NaOH) is supplied from a NaOH supply part 33. Furthermore, the desulfurization performance may be improved by supplying an air 34 as needed.

In addition, a part of the alkali absorbent 32 is introduced into the $SO_2$ and $NO_2$ absorption part 21 by a branch line $L_4$, and the desulfurization performance may be improved by supplying the alkaline agent to the absorbent 23 containing the sulfite.

In the $SO_2$ alkali removal unit 31, the desulfurized flue gas 11E is introduced into the cooling water washing part 41 again, and when introducing the introduced flue gas 11E upward, cleaning and cooling is performed by bringing the flue gas 11E into contact with a cooling water 43 circulated by a circulation line $L_3$. A circulation pump $P_3$ and a cooling heat exchanger 42 are disposed in the circulation line $L_3$.

In addition, since the sulfite in the solution is diluted by supplying an excessive water 43a of the cooling water 43 to the $SO_2$ alkali removal unit 31 via an excessive water supply line $L_5$, the desulfurization performance is improved.

Furthermore, a part of the excessive water 43a is discharged to an effluent treatment line $L_{13}$ via an effluent line $L_6$.

A known oxidation basin 51 is disposed in the effluent treatment line $L_{13}$, and the oxidation treatment is accelerated here. In addition, an effluent 52 can be applied to, for example, the treating water of a limestone-gypsum method or the like.

Furthermore, on the outlet side of the finish denitration and desulfurization cooling tower 20, a gas cooling part demister is installed to prevent entrainment of mist accompanied in the gas.

According to such a configuration, when the $NO_2$ concentration in the flue gas 11A discharged from the boiler B is approximately 6 to 15 ppm, and the $SO_2$ concentration is approximately 300 to 1,000 ppm, by passing through the denitration unit 12 the desulfurization unit 13, the $NO_2$ concentration in the flue gas 11C becomes approximately 0.5 to 2 ppm, and the $SO_2$ concentration becomes approximately 15 to 50 ppm.

Moreover, the flue gas 11C after the denitration and desulfurization treatment is introduced into the $SO_2$ and $NO_2$ absorption part 21 from the gas introduction line $L_{11}$. When the flue gas 11C comes into contact with the circulating absorbent 23 containing the sulfite, $NO_2$ and $SO_2$ in the gas are highly removed, the $NO_2$ concentration in the gas becomes 0.1 ppm or less, and the $SO_2$ concentration becomes 1.0 ppm or less.

Next, the flue gas 11D after the $SO_2$ and $NO_2$ absorption treatment is introduced into the $SO_2$ alkali removal unit 31 on the upper side thereof. When the flue gas 11D comes into contact with the circulating alkali absorbent 32, $SO_2$ in the gas is highly removed, the $NO_2$ concentration in the gas becomes 0.1 ppm or less, and the $SO_2$ concentration becomes 0.1 ppm or less.

Next, the flue gas 11E after the $SO_2$ alkali removal treatment is introduced into the cooling water washing part 41 on the upper side thereof. When the flue gas 11E comes into contact with the circulating cooling water 43, the alkali absorbent accompanied in the gas is removed, and the gas is cooled. The $NO_2$ concentration in the flue gas 11E becomes 0.1 ppm or less, and the $SO_2$ concentration becomes 0.1 ppm or less.

EXAMPLE

Hereinafter, the effects of the present invention will be specifically described by Examples, but the present invention is not limited thereto.

Example 1

As in the air pollution control apparatus 10A illustrated in FIG. 1, when the finish denitration and desulfurization unit 14 is provided between the desulfurization unit 13 and the carbon dioxide recovery unit 15, a $SO_2$ accumulation ratio and a $NO_2$ accumulation ratio to the absorbent of the carbon dioxide recovery unit 15 were determined. Furthermore, an amine quantity ratio accompanied in the purified gas 16 discharged from the carbon dioxide recovery unit 15 was obtained.

Example 2

As in the air pollution control apparatus 10B illustrated in FIG. 2, when the finish denitration and desulfurization unit 14 and the $SO_2$ alkali removal unit 18 are provided between the desulfurization unit 13 and the carbon dioxide recovery unit 15, a $SO_2$ accumulation ratio and a $NO_2$ accumulation ratio to the absorbent of the carbon dioxide recovery unit 15 were determined. Furthermore, an amine quantity ratio accompanied in the purified gas 16 discharged from the carbon dioxide recovery unit 15 was obtained.

Comparative Example 1

As in the air pollution control apparatus of the related art, when the finish denitration and desulfurization unit 14 and the $SO_2$ alkali removal unit 18 are not provided, and the carbon dioxide recovery unit 15 is directly installed on the downstream side of the desulfurization unit 13, a $SO_2$ accumulation ratio and a $NO_2$ accumulation ratio to the absorbent of the carbon dioxide recovery unit 15 were determined. Furthermore, an amine quantity ratio accompanied in the purified gas 16 discharged from the carbon dioxide recovery unit 15 was obtained.

The results are illustrated in Table 1.

TABLE 1

|  | Example 1 | Example 2 | Comparative Example 1 |
|---|---|---|---|
| Gas temperature of $CO_2$ recovery unit inlet (° C.) | 40 | 40 | 52 |
| $SO_2$ concentration of $CO_2$ recovery unit inlet (ppm) | 1 or less | 0.1 or less | 5 |
| $SO_2$ accumulation ratio to absorbent of $CO_2$ recovery unit (—) | 1 | 0.1 | 1 (standard) |
| Amine quantity ratio accompanied in purified gas | 0.3 | 0.3 | 1 (standard) |
| $NO_2$ concentration of $CO_2$ recovery unit inlet (ppm) | 0.1 or less | 0.1 or less | 1 |
| $NO_2$ accumulation ratio to absorbent of $CO_2$ recovery unit (—) | 0.1 | 0.1 | 1 (standard) |
| Finish denitration and desulfurization unit 14 | Presence | Presence | Absence |
| $SO_2$ alkali removal unit 18 | Absence | Presence | Absence |

As illustrated in Table 1, in Example 1, in the case of providing the finish denitration and desulfurization unit 14, $NO_2$ and $SO_2$ in the gas were highly removed, the $NO_2$ concentration in the gas became 0.1 ppm or less, and the $SO_2$ concentration became 1.0 ppm or less.

The $SO_2$ accumulation ratio to the absorbent of the carbon dioxide recovery unit 15 at this time was 1. Furthermore, the $NO_2$ accumulation ratio to the absorbent of the carbon dioxide recovery unit 15 was 0.1. Furthermore, the amine quantity ratio accompanied in the purified gas 16 discharged from the carbon dioxide recovery unit 15 was 0.3.

Furthermore, in Example 2, in the case of providing the finish denitration and desulfurization unit 14 and the $SO_2$ alkali removal unit 18, $NO_2$ and $SO_2$ in the gas were highly removed, the $NO_2$ concentration in the gas became 0.1 ppm or less, and the $SO_2$ concentration became 0.1 ppm or less.

The $SO_2$ accumulation ratio to the absorbent of the carbon dioxide recovery unit 15 at this time was 0.1. Furthermore, the $NO_2$ accumulation ratio to the absorbent of the carbon dioxide recovery unit 15 was 0.1. Furthermore, the amine quantity ratio accompanied in the purified gas 16 discharged from the carbon dioxide recovery unit 15 was 0.3.

In Example 2, since the $SO_2$ alkali removal unit 18 is further provided in Example 1, the $SO_2$ concentration was 1/10 (0.1 ppm or less) of Example 1, and the $SO_2$ accumulation ratio to the absorbent of the carbon dioxide recovery unit 15 was also 1/10 (0.1 ppm or less) of Example 1.

REFERENCE SIGNS LIST 10A to 10C AIR POLLUTION CONTROL APPARATUS
11A to 11F FLUE GAS
12 DENITRATION UNIT
13 DESULFURIZATION UNIT
14 FINISH DENITRATION AND DESULFURIZATION UNIT
15 CARBON DIOXIDE RECOVERY UNIT

The invention claimed is:

1. An air pollution control apparatus comprising:
   a denitration unit that removes nitrogen oxides from a flue gas up to an extremely low concentration, the flue gas being discharged from a boiler and containing nitrogen oxides, sulfur oxides, and carbon dioxide;
   a desulfurization unit that is installed on a gas flow downstream side of the denitration unit to remove the sulfur oxides in the flue gas up to an extremely low concentration;
   a finish denitration and desulfurization unit that is installed on the gas flow downstream side of the desulfurization unit to perform finish denitration and desulfurization of $NO_2$ having an extremely low concentration and $SO_2$ having an extremely low concentration remaining in the flue gas by an absorbent containing sulfite;
   a $SO_2$ alkali removal unit that is installed on the gas flow downstream side of the finish denitration and desulfurization unit to remove residual $SO_2$ in the flue gas by alkali; and
   a carbon dioxide recovery unit that is installed on the gas flow downstream side of the finish denitration and desulfurization unit to remove and recover the carbon dioxide in the flue gas.

2. The air pollution control apparatus according to claim 1,
   wherein the finish denitration and desulfurization unit is configured to place emphasis on the $NO_2$ removal at the expense of the $SO_2$ removal in the flue gas.

3. The air pollution control apparatus according to claim 1, further comprising:
   a gas cooling unit that is installed on the gas flow downstream side of the $SO_2$ alkali removal unit to cool the flue gas.

4. The air pollution control apparatus according to claim 3, wherein the finish denitration and desulfurization unit, the $SO_2$ alkali removal unit, and the gas cooling unit are integrally disposed in a tower.

5. The air pollution control apparatus according to claim 3, wherein excessive water of the gas cooling unit is introduced into the $SO_2$ alkali removal unit.

6. The air pollution control apparatus according to claim 1, wherein an oxidizing agent is introduced into the $SO_2$ alkali removal unit.

7. The air pollution control apparatus according to claim 1, wherein excessive water of the $SO_2$ alkali removal unit is introduced into the finish denitration and desulfurization unit.

* * * * *